United States Patent [19]
Kawamura et al.

[11] Patent Number: 5,231,473
[45] Date of Patent: Jul. 27, 1993

[54] LENS BARREL

[75] Inventors: Hiroshi Kawamura, Tokyo; Kunio Nakazato, Kanagawa, both of Japan

[73] Assignee: Sony Corporation, Japan

[21] Appl. No.: 751,775

[22] Filed: Aug. 29, 1991

[30] Foreign Application Priority Data

Sep. 5, 1990 [JP] Japan ................... 2-235368
Sep. 5, 1990 [JP] Japan ................... 2-235369

[51] Int. Cl.⁵ ............................................. G02B 15/14
[52] U.S. Cl. .................................. 359/694; 359/696; 359/704
[58] Field of Search ..................... 359/694–706, 359/813–830; 354/400, 404, 286, 288

[56] References Cited

U.S. PATENT DOCUMENTS

| | | | |
|---|---|---|---|
| 3,610,733 | 10/1971 | Back | 359/700 |
| 4,008,951 | 2/1977 | Himmelsbach | 359/696 |
| 4,353,634 | 10/1982 | Himmelsbach | 359/698 |
| 4,749,268 | 6/1988 | Moskovich et al. | 359/698 |
| 4,764,784 | 8/1988 | Torikoshi et al. | 359/705 |
| 4,767,200 | 8/1988 | Inaba et al. | 359/699 |
| 5,016,993 | 5/1991 | Akitake | 359/696 |

FOREIGN PATENT DOCUMENTS

| | | | |
|---|---|---|---|
| 57-072128 | 6/1982 | Japan . | |
| 261610 | 10/1989 | Japan | 359/698 |
| 301707 | 12/1990 | Japan | 359/694 |

OTHER PUBLICATIONS

Lens Barrel for Zoom Lens, vol. 10, No. 7 (p. 419) Jan. 11, 1986, Kazuo Tanji (author) (abstract only).

*Primary Examiner*—Bruce Y. Arnold
*Assistant Examiner*—Thong Nguyen
*Attorney, Agent, or Firm*—Ronald P. Kananen

[57] ABSTRACT

A lens barrel of a camera includes a driving power source, a plurality of lenses mounted in the barrel, and a plurality of reference shafts extending parallel to an optical axis. At least one of the reference shafts is provided with a threaded portion and used as a rotating shaft of the driving power source. A recess and a protrusion are also provided for preventing deflection of a body of the driving power source, so that the lens moves to and fro along the threaded portion upon activation of the driving power source.

13 Claims, 3 Drawing Sheets

LENS BARREL

BACKGROUND OF THE INVENTION

1. Field of the Invention

This invention relates to a lens barrel of a camera such as a video camera, and particularly to a lens barrel of a camera having a motor for controlling axial movement of a lens for focusing and zooming.

2. Description of the Background Art

A video camera has a lens barrel containing a plurality of lenses such as a zoom lens, a focusing lens and the like. Referring to FIG. 3, a conventional lens barrel 50 includes a cylindrical front barrel 51 and a cylindrical rear barrel 52 fixedly connected to the front barrel 51. The front barrel 51 has front and rear jaws 51a and 51b which extend radially inwardly from respective front and rear ends thereof. The front jaw 51a retains a focusing lens group 53 (hereinafter referred to as the focusing lens) on an inner periphery thereof. The rear jaw 51b retains a compensator lens group 54 (hereinafter referred to as the compensator lens) on an inner periphery thereof. The rear barrel 52 has a rear jaw 52b which extends radially inwardly from periphery of a rear end thereof.

A pair of guide shafts 55, 55 are supported between the front and rear jaws 51a, 51b of the front barrel 51 in parallel to an optical axis C. Further, another pair of guide shafts 56, 56 are supported between the rear jaw 51b of the front barrel 51 and the rear jaw 52b of the rear barrel 52 in parallel to the optical axis C.

The guide shafts 55, 55 pass through a first movable lens holder ring 58, so that the lens holder ring 58 is slidably supported thereon. The lens holder ring 58 retains a variator lens group 57 (hereinafter referred to as the variator lens) which fulfills a variable zoom function. The guide shafts 56, 56 pass through a second movable lens holder ring 60 so that the lens holder ring 60 is slidably supported thereon. The lens holder ring 60 retains a master lens group 59 (hereinafter referred to as the master lens) which fulfills focusing, compensating and image-forming functions.

The first movable lens holder ring 58 is provided with a radial pin 61 on an outer periphery thereof. The pin 61 is fitted into a cam groove 62a extending spirally along at least an inner face of a cam drum 62 which is supported between the front and rear jaws 51a, 51b of the front barrel 51. The cam drum 62 is connected through a pin 64 to a zoom ring 63, which is concentrically disposed outside of the front barrel 51 and rotates around the front barrel 51. When the zoom ring 63 rotates, the associated cam drum 62 rotates inside of the front barrel 51 in a clockwise or counterclockwise direction. The rotating movement of the cam drum 62 causes the pin 61 engaging the spiral cam groove 62a to move to and fro in an axial direction of the guide shafts 55, 55. Accordingly, the first movable lens holder ring 58 moves to and fro along the guide shafts 55, 55. To this end, the variator lens 57, retained by the first movable lens holder ring 58, moves forward or backward along the optical axis C.

The second movable lens holder ring 60 is threadedly engaged with a rotating shaft of a motor 65 which extends forwardly from a housing body of the motor 65 through the rear jaw 52b of the rear barrel 52. The forward portion of the rotating shaft is formed as a screw 66 which serves for engagement with the second movable lens holder ring 60. When the motor 65 is actuated, the screw 66 starts to rotate. According to rotation of the screw 66, the second movable lens holder ring 60 moves forward or backward along the guide shafts 56, 56 parallel to the optical axis C. To this end, the master lens 59 retained by the lens holder ring 60 moves to and fro in a direction of the optical axis. In FIG. 3, reference numeral 67 represents a speed reducer of the motor 65.

As mentioned above and as shown in FIG. 3, the conventional lens barrel 50 needs a screw 66 for moving the master lens 59 in addition to the two pairs of guide shafts 55, 55 and 56, 56 which are used for moving the variator lens 57 and the master lens 59, respectively. This leads to the use of a large number of parts, a complicated structure and large a size of the lens barrel so that manufacturing costs for the lens barrel are high.

Further, since the conventional lens barrel 50 includes front and rear barrels 51, 52 in which the guide shafts 55 and 56 are supported, respectively, there exists a possible risk that the focusing, variator, compensator and master lenses 53, 57, 54 and 59 may be decentered or inclined relative to the optical axis C. Upon assembling the rear barrel 52 onto the front barrel 51, careful assembly must be performed such that a reference axis for the rear barrel 52 is strictly aligned with that for the front barrel 51. However, this alignment procedure eventually suffers from the large number of parts employed therein so that an effective and accurate assembling operation becomes difficult.

FIG. 4 depicts a conventional motor mounting for the lens barrel for control of focusing and zooming. As illustrated in FIG. 4, reference numerals 70, 71 represent front and rear walls of the lens barrel, respectively. A sliding bearing 73 is provided on the front wall 70 while a drive motor 80 is mounted on the rear wall 71. Namely, upper and lower parts of a front side plate 81 of the motor 80 is fixed on the rear wall 71 by means of screws 75, 75, respectively. The front side plate 81 is provided, at the center thereof, with a sliding bearing 86. A rear side plate 87 of the motor 80 is provided, at the center thereof, with a sliding bearing 89. The motor 80 has a rotating shaft 82, which extends to the front wall 70 and is rotatably supported on the sliding bearings 73, 86 and 89. The rotating shaft 82 is provided with a screw 82a on a front side thereof. The screw 82a extends through and threadedly engages with a movable lens holder ring 76 which retains a variator lens (not shown) for zooming. The motor 80 has a stator yoke 83, a driving coil 84 contained in the stator yoke 83, and a magnetic rotor 85 which is attached around the rotating shaft 82. When the motor 80 is activated, the driving coil 84 is electrically energized so that the rotating shaft 82 and the screw 82a start to rotate. To this end, the movable lens holder ring 76 moves to and fro along the screw 82a in a direction of the optical axis.

However, such a conventional motor mounting for the lens barrel has a disadvantage that the screw 82a of the rotating shaft 82 suffers from excessive load due to the motor mounting. Namely, since the motor 80 is fixedly mounted on the rear wall 71 of the lens barrel by the screws 75, an excessive load is applied on the screw 82a when the bearings 73, 86, 89 are decentered relative to the rotating shaft 82.

In order to eliminate the excessive load L applied onto the screw 82a, there has been provided another conventional motor mounting as illustrated in FIG. 5, in which like reference remarks are employed to indicate like parts of the motor mounting described above, and therefore detailed explanations thereof will be omitted hereinafter. Referring to FIG. 5, front and rear walls 70, 71 of the lens barrel are integrally connected to each other through a reinforcing member 72 which extends parallel to a screw 82a of a rotating shaft 82. The screw 82a is rotatably supported between the front and rear walls 70, 71 on bearings 73, 74 which are provided in the front and rear walls 70, 71, respectively. A tip end of the rotating shaft 82 contacts a side plate 88 formed of a leaf spring whereby the rotating shaft 82 is urged in the axial forward direction.

However, the conventional motor mounting as illustrated in FIG. 5 has a disadvantage that the reinforcing member 72 spanning the front and rear walls 70, 71 must be accomodated in the lens barrel, so that the lens barrel as a whole is greater in size and weight than that shown in FIG. 4.

SUMMARY OF THE INVENTION

It is an object of the present invention to eliminate the aforementioned disadvantages and to provide a miniatuarized lens barrel of a camera having a motor in which a load applied to a rotating shaft of the motor is reduced.

In order to accomplish this object, there is provided a lens barrel of a camera including a driving power source, a plurality of lenses mounted therein and a plurality of reference shafts extending parallel to an optical axis. At least one of the reference shafts is used as a rotating shaft of the driving power source and rotatably supported on bearings which are provided on the barrel and a housing body of the driving power source. The reference shaft has a threaded portion on a front side thereof so that the lenses move to and fro along the threaded portion upon activation of the driving power source. The lens barrel further includes detent means for preventing deflection of a body of the driving power source. The detent means includes a recess formed on an outer surface of a housing body of the driving power source and a protrusion which is provided on an outer surface of the barrel and fitted into the recess.

DETAILED DESCRIPTION OF THE PREFERRED EMBODIMENT

The preferred embodiment of a lens barrel of a video camera having a motor for controlling axial movement of focusing and zoom lenses, according to the present invention, will now be described with reference to the accompanying drawings.

Figure 1:
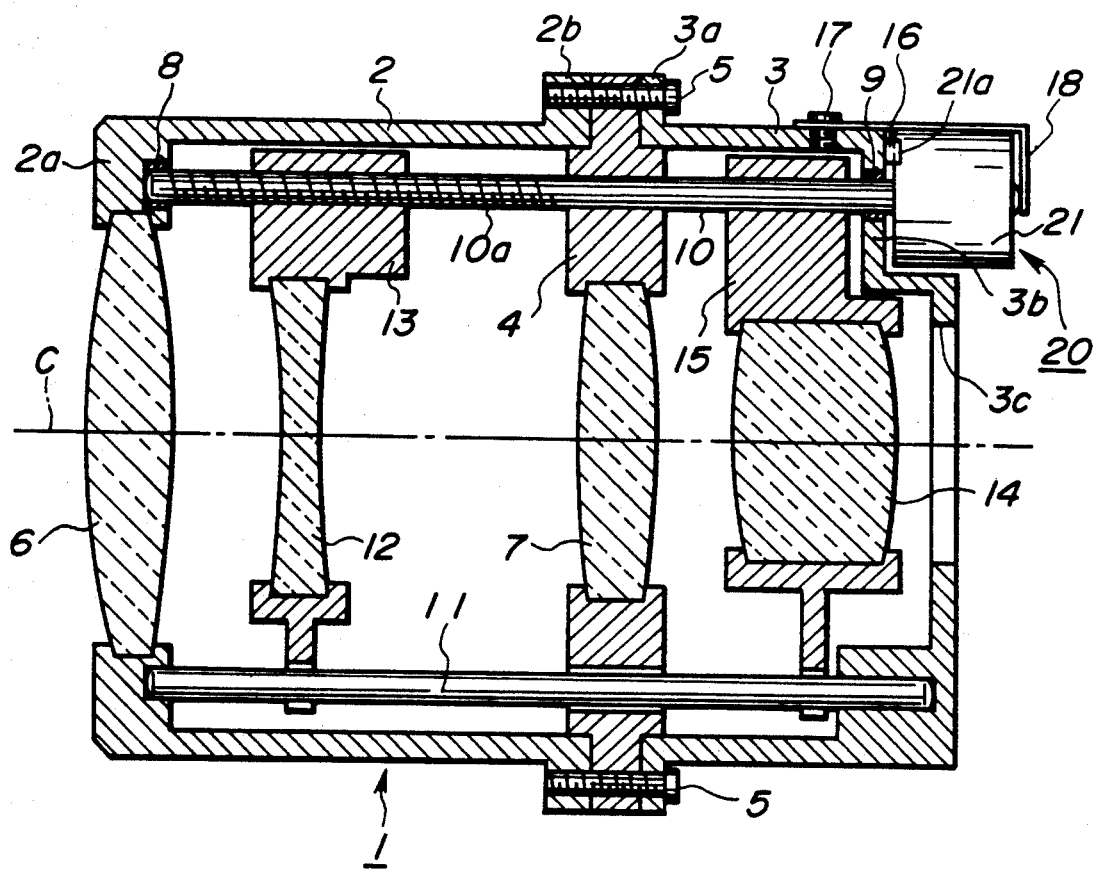
FIG. 1 is a sectional view of a lens barrel of a camera according to one embodiment of the present invention.

Referring to FIG. 1, a lens barrel 1 includes a cylindrical front barrel 2, a cylindrical rear barrel 3 and a lens holder ring 4 placed between the front and rear barrels 2, 3. The front barrel 2 has a front jaw 2a extending inwardly from a front end thereof and a rear flange 2b extending outwardly from a rear end thereof. A focusing lens 6 used as a front lens is fitted into an opening formed inside the front jaw 2a of the front barrel 2.

The rear barrel 3 has a front flange 3a extending outwardly from a front end thereof and a rear shoulder portion 3b formed on a rear part thereof. The lens holder ring 4 is interposed between the rear flange 2b of the front barrel 2 and the front flange 3a of the rear barrel 3 and fixed therebetween by screws 5. A compensator lens 7 is fitted into an inside opening of the lens holder ring 4.

As shown in FIG. 1, bearings 8 and 9 are disposed on the front jaw 2a and the rear shoulder portion 3b, on which a first reference shaft (rotating shaft) 10 is rotatably supported parallel to an optical axis C. The reference shaft 10 extends through both the lens holder ring 4 and a stepping motor (driving power source) 20. A second reference shaft 11 is also supported between the front jaw 2a of the front barrel 2 and the rear shoulder portion 3b of the rear barrel 3 parallel to the optical axis C and the first reference shaft 10.

The first reference shaft 10 is used as a rotating shaft of the stepping motor 20, a front side of which is formed with a threaded portion 10a. The threaded portion 10a extends through a threaded opening provided on an outer periphery of a first movable lens holder ring 13, while the second reference shaft 11 passes through a non-threaded opening thereof which is diametrically opposite to the threaded opening relative to the optical axis C. The movable lens holder ring 13 is slidably supported on both the first and second reference shafts 10, 11. A variator lens 12 for zooming is fitted to the movable lens holder ring 13 and retained thereby on the reference shafts 10, 11 so as to be slidable within the front barrel 2.

The first and second reference shafts 10, 11 extend through non-threaded openings provided on an outer periphery of a second movable lens holder ring 15. The reference shafts 10, 11 are diametrically opposite each other relative to the optical axis C and retain the lens holder ring 15 so that the lens holder ring 15 is slidable within the rear barrel 3. A master lens 14 having focusing, compensating and image-forming functions is fitted to the movable lens holder ring 15 supported by the reference shafts 10, 11 and is slidable along the reference shafts 10, 11 within the rear barrel 3. Accordingly, the reference shafts 10, 11 function not only as a reference upon assembling the front and rear barrels 2, 3 but also as a guide for reciprocating movement of the first and second lens holder rings 13, 15 along the optical axis C. Further, the reference shaft 11 restrains axial displacement of the lens holder rings 13, 15.

Figure 2:
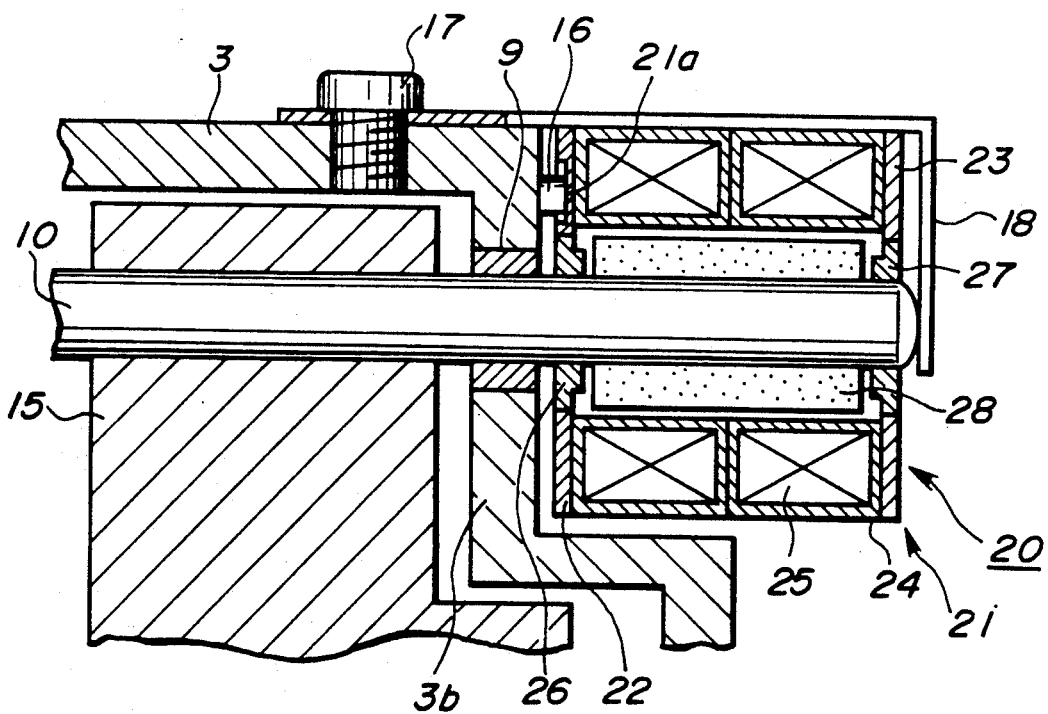
FIG. 2 is an enlarged sectional view of a motor-mounting portion of the lens barrel shown in FIG. 1.

As illustrated in FIG. 2, the stepping motor 20 includes a motor body 21, side plates 22, 23 and a stator yoke 24 containing multi-phase driving coils 25 therein. The side plate 22 has a recess 21a elongated in a radial direction of the reference shaft 10. Into the recess 21a is engaged a pin 16 extending outwardly from a surface of the rear shoulder portion 3b which is situated opposite the side plate 22. By this provision, the motor body 21 is restrained from rotational movement in the same rotational direction as that of the reference shaft 10 and retained in a floating state on the rear shoulder portion 3b rather than fixedly mounted thereto. At the central portions of the side plates 22, 23 are provided sliding bearings 26, 27 through which the first reference shaft 10 is rotatably supported. The first reference shaft 10 interposed between the sliding bearings 26, 27 is surrounded with a magnetic rotor 28 which is fixedly attached therearound. The first reference shaft 10 has semi-hemispherical ends on both the front and rear thereof. One semi-hemispherical end of the first reference shaft 10 projected outwardly from the sliding bearing 27 is urged by an L-shaped leaf spring 18 which is fixed by a screw 17 on an outer peripheral surface of the rear barrel 3. Accordingly, the first reference shaft 10 is biased toward the front jaw 2a thereof, so that the reference shaft 10 is prevented from fluctuation in an axial direction thereof and a load applied thereto is thereby reduced.

When the stepping motor 20 is actuated, the first reference shaft 10 starts its rotating movement and thereby the screw 10a thereof rotates. The first movable lens holder ring 13 is moved by the rotation of the screw 10a, backward and forward along the first and second reference shafts 10, 11. As a result, the variator lens 12 retained by the first movable lens holder ring 13 moves to and fro along the optical axis C so as to perform a power zooming function.

Further, the second movable lens holder ring 15 is moved by a linear motor (not shown) mounted on an inner surface of the rear shoulder portion 3b, backward and forward along the reference shafts 10, 11 in the direction of the optical axis C. To this end, the master lens 14 retained by the second movable lens holder ring 15 moves to and fro along the optical axis C so as to perform auto-focusing.

The rear shoulder portion 3b of the rear barrel 3 is formed on the mounting side of the lens barrel 3 near a body of a video camera in which a CCD (charge coupled device) is located at a position aligned with the center of an opening 3c of the rear barrel 3.

As described above, the first reference shaft 10 is used not only as the guide for moving the first and second movable lens rings 13, 15 which retain the variator lens 12 and the master lens 14, respectively, but also as the rotating shaft of the stepping motor 20. Therefore, the total number of parts used in the lens barrel 1 is small and manufacturing costs therefor are low as compared with those of a conventional lens barrel.

Figure 3:
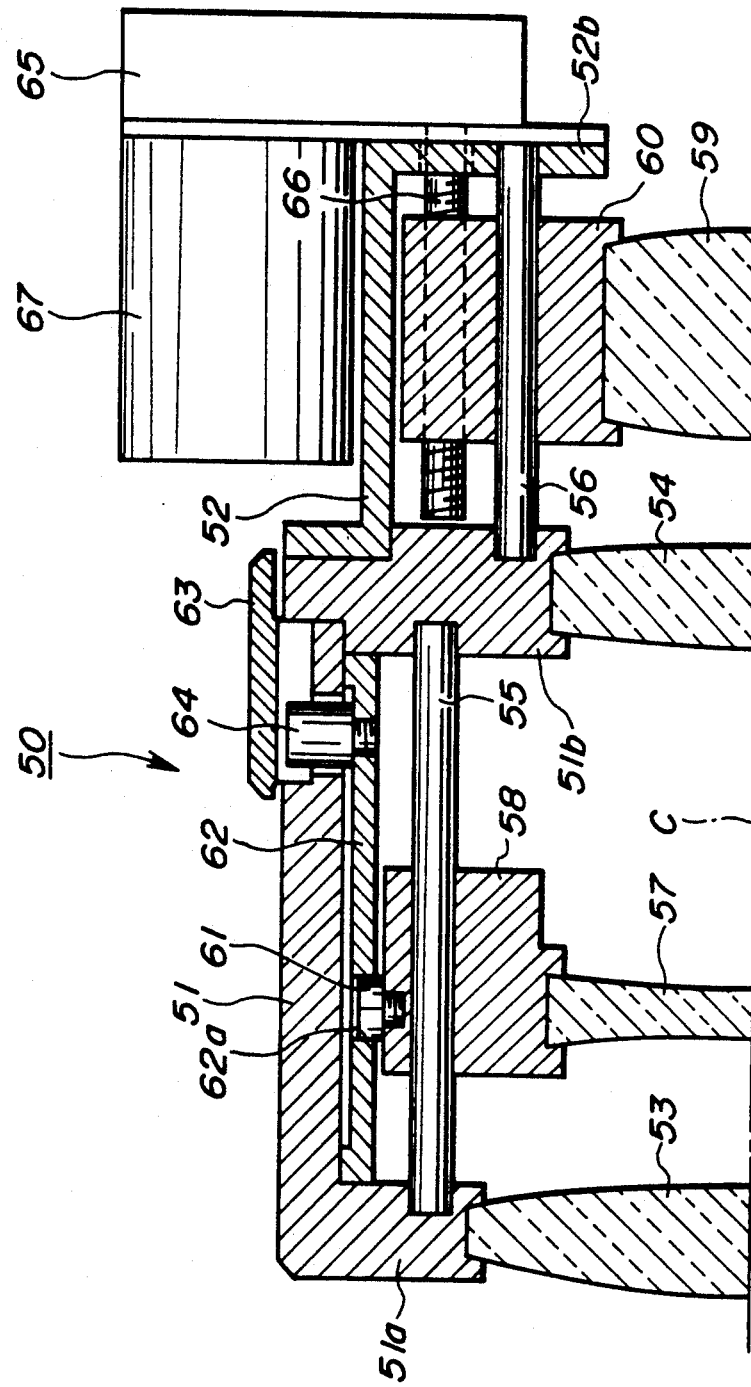
FIG. 3 is a sectional view of a conventional lens barrel of a camera.
Figure 4:
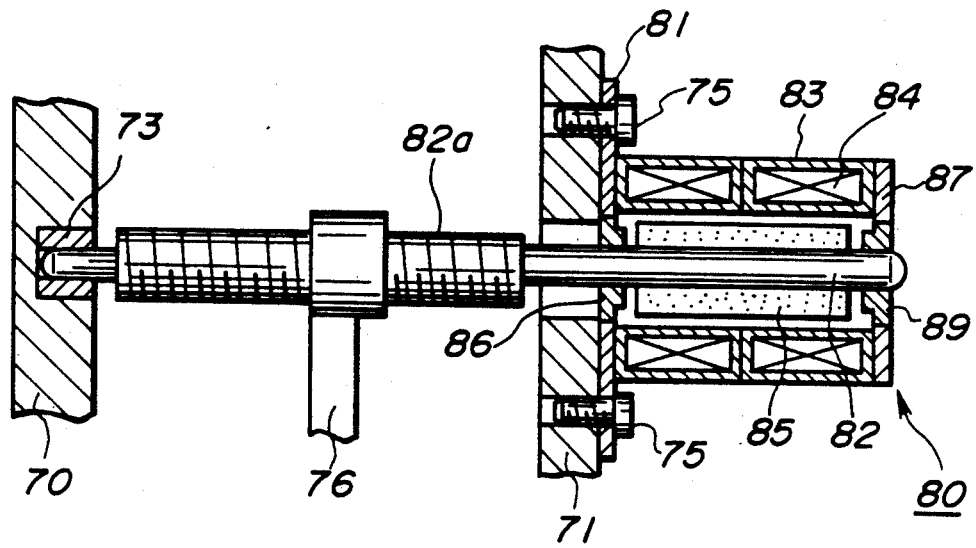
FIG. 4 is an enlarged sectional view of a motor-mounting portion of a conventional lens barrel.
Figure 5:
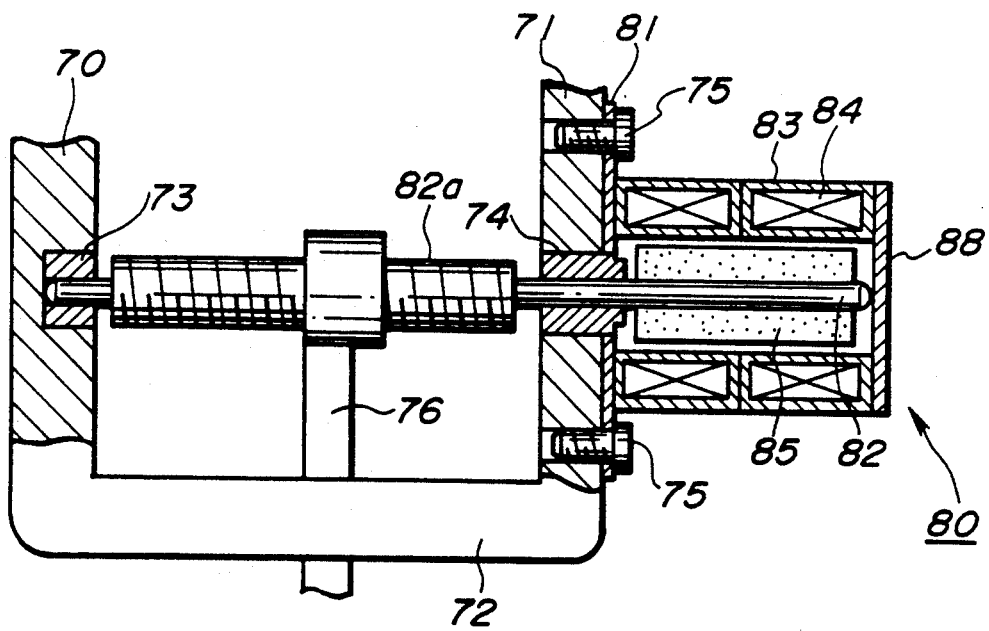
FIG. 5 is an enlarged sectional view of a motor-mounting portion of another conventional lens barrel.

In addition, in the lens barrel 1 according to the present invention, the motor body 21 of the stepping motor 20 is floatingly mounted on the outer surface of the rear shoulder portion 3b of the rear barrel 3 by the engagement of the pin 16 with the recess 21a. On the other hand, as indicated in FIG. 3 illustrating a motor body mounting in the conventional lens barrel, a motor body is directly fixed by screws on a rear jaw of a rear barrel of the lens barrel. The reason for such a floating mounting state of the motor body 21 in the lens barrel 1 according to the present invention is that, even when a deflecting force is generated on the bearings 8, 9 during rotation of the reference shaft 10, the reference shaft 10 is prevented from an excess load due to the deflecting force. As a result, a load torque applied onto the screw 10a of the first reference shaft is considerably reduced and therefore consumption of electric power is effectively conserved. Further, the size and weight of the stepping motor 20 is reduced by reason of the motor body being mounted without screws. In addition, end surfaces of the front jaw 2a and the rear shoulder portion 3b are flush with those of the front and rear barrels 2, 3 as shown in FIG. 1, so that the size and weight of the lens barrel 1 may be reduced.

The reduction in the size and weight of the lens barrel 1 also results from the simple structure thereof. Namely, the first reference shaft 10 having the screw 10a functions as the guide for moving the first movable lens holder ring 13 along the reference shaft 10. For the same purpose, the conventional lens barrel necessitates separately the guide member and the driving screw.

In addition, since the front and rear barrels 2, 3 of the lens barrel 1 have the common reference shafts 10, 11, an accuracy of assembly of the lens barrel 1 is improved so that a total accumulated error upon final assembly may be eliminated.

In the case of assembling the parts of the lens barrel 1, parts such as the first and second movable lens holder rings 13, 15 and the like can be arranged in proper positions on the basis of the reference shafts 10, 11. Therefore, the reference shafts 10, 11 act as a referent during assembly, resulting in an improvement in accuracy and efficiency with the assembly operation.

Although the bearing in the front barrel of the lens barrel according to the invention is a sliding bearing, a radial bearing or a thrust bearing may be used. The motor mounted on the lens barrel of the invention is not limited to a stepping motor and may be a motor of another type.

Moreover, the pin provided on the rear barrel and the recess formed on the motor body, which function as detent means upon engagement with each other, may be inversely provided on the motor body and the rear barrel, respectively. Configurations of the pin and the recess are not limited to those described in the above preferred embodiment of the invention, but may be of other suitable configuration.

Furthermore, the second reference shaft may be provided with a threaded portion on a rear side thereof and used as a rotating shaft of a stepping motor mounted separately on the rear barrel, rather than the first reference shaft. Accordingly, the second movable lens holder ring may move to and fro in the direction of the optical axis by the rotating movement of the second reference shaft.

As is obvious from the aforementioned description, the lens barrel according to the present invention is further applicable to a still camera.

What is claimed is:

1. A lens barrel of a camera comprising:
a driving power source;
a plurality of lenses mounted within said lens barrel and having a common optical axis;
a plurality of reference shafts each of which extends parallel to said optical axis of said lenses and serves as a guide for said lenses, at least one of said reference shafts being a rotating shaft of said driving power source and being rotatably supported in the barrel and driven by said driving power source so that at least one of said lenses is reciprocally movable in an axial direction of one of said reference shafts upon activation of said driving power source;
said driving power source comprising a motor; and
wherein the barrel has a pair of bearings at front and rear ends thereof and a protrusion at a rear end thereof, while said motor has a pair of bearings at front and rear ends thereof and a recess at an end thereof which faces the protrusion, said protrusion being engaged into said recess so that the protrusion and the recess function as detent means for preventing rotational movement of a body of said motor, said rotating shaft of said motor being rotatably supported on said bearings of the barrel and the motor.

2. The lens barrel according to claim 1, wherein said reference shaft which is a rotating shaft of said motor has a threaded portion along which said at least one of said lenses moves.

3. The lens barrel according to claim 1, wherein an end of said rotating shaft abuts biasing means mounted on an outer periphery of the barrel so that said rotating shaft is urged in an axial direction thereof whereby the protrusion is urged into the recess.

4. The lens barrel according to claim 3, wherein said biasing means is an L-shaped leaf spring.

5. A motor mounting for a lens barrel of a camera in which a rotating shaft of a motor extending parallel to an optical axis is rotatably supported on bearings disposed on both front and rear ends of the barrel, said rotating shaft having a threaded portion on a portion of said shaft opposite a body of said motor such that a lens moves along the threaded portion in a direction of the optical axis via rotational movement of the motor, comprising:
   detent means for preventing deflection of the motor body, said detent means including a recess formed on an outer surface of a housing body of the motor and a protrusion which is provided on an outer surface of the barrel and fitted into the recess.

6. The motor mounting according to claim 5, wherein an end of said rotating shaft abuts biasing means mounted on an outer periphery of the barrel so that said rotating shaft is urged in an axial direction thereof whereby the protrusion is urged into the recess.

7. The motor mounting according to claim 6, wherein said biasing means is an L-shaped leaf spring.

8. A driving controllable lens barrel of a camera comprising:
   a driving power source;
   a plurality of lenses mounted within said lens barrel and having a common optical axis;
   a plurality of reference shafts extending parallel to said optical axis, at least one of said reference shafts being a rotating shaft of said driving power source and rotatably supported on bearings which are provided on the barrel and a housing body of said driving power source, said reference shaft having a threaded portion on a portion thereof remote from said housing body, so that at least one of said lenses is movable to and from along the threaded portion of said reference shaft upon activation of said driving power source;
   detent means for preventing deflection of said housing body of the driving power source, said detent means including a recess formed on an outer surface of said housing body of said driving power source and a protrusion which is provided on an outer surface of the barrel and fitted into the recess.

9. The lens barrel according to claim 8, wherein said driving power source is a motor.

10. The lens barrel according to claim 9, wherein said barrel has a pair of bearings at front and rear ends thereof and a protrusion at a rear end thereof, while said motor has a pair of bearings at front and rear ends thereof and a recess at an end thereof which faces the protrusion, said protrusion being engaged into said recess so that the protrusion and the recess function as detent means for preventing deflection of said housing body of said motor, said rotating shaft of said motor being rotatably supported on said bearings of the barrel and the motor.

11. The lens barrel according to claim 9, wherein said bearing at the front end is a sliding, radial or thrust bearing.

12. The lens barrel according to claim 9, wherein an end of said rotating shaft abuts biasing means mounted on an outer periphery of the barrel so that said rotating shaft is urged in an axial direction thereof whereby the protrusion is urged into the recess.

13. The lens barrel according to claim 12, wherein said biasing means is an L-shaped leaf spring.

* * * * *